United States Patent Office 3,365,464
Patented Jan. 23, 1968

3,365,464
7-ALKYL-3-(2-AMINOBUTYL)INDOLES
Jacob Szmuszkovicz, Kalamazoo, Mich., assignor to The Upjohn Company, Kalamazoo, Mich., a corporation of Delaware
No Drawing. Continuation-in-part of application Ser. No. 201,251, June 11, 1962. This application Feb. 5, 1965, Ser. No. 430,766
5 Claims. (Cl. 260—326.15)

ABSTRACT OF THE DISCLOSURE

The compounds of 7-alkyl-3-(2-aminobutyl)indoles and acid addition salts thereof are disclosed. These compounds are useful as enzyme inhibitors, particularly monoamine oxidase inhibitors, and are useful in the treatment of mental depressant states.

This application is a continuation-in-part of application Ser. No. 201,251, filed June 11, 1962, now abandoned.

The present invention relates to novel 7-alkyl-3-(2-aminobutyl)indoles and more particularly is directed to 7-alkyl-3-(2-aminobutyl)indole free bases, and pharmacologically acceptable acid addition salts thereof.

The novel 7-alkyl-3-(2-aminobutyl)indole free bases of the present invention can be represented by the formula:

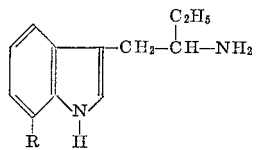

wherein R is alkyl of 1 to 4 carbon atoms, inclusive, e.g., methyl, ethyl, propyl, isopropyl, butyl, isobutyl, and the like.

In view of the presence of an asymmetric carbon atom, the novel 7-alkyl-3-(2-aminobutyl)indoles of the present invention can exist as the d- and l-isomers or as a racemic mixture. In accordance with the methods of synthesis set forth below, the compounds are obtained as racemates. The racemates can be resolved, if so desired, into the d- and l-isomers.

The novel compounds of the present invention can be prepared by various procedures known in the art. For example, the novel 7-alkyl-3-(2-aminobutyl)indole free bases can be prepared by the process disclosed by Snyder et al., J. Am. Chem. Soc. 69, 3140, 1947. A 7-alkylgramine is reacted with 1-nitropropane and the resulting nitro derivative is hydrogenated in the presence of a base metal catalyst, e.g., Raney nickel, or a noble metal catalyst, e.g., platinum oxide, or is reduced with lithium aluminum hydride. The 7-alkylgramines can be prepared by the process of Rydon, J. Chem. Soc. 1948, 705.

Alternatively, the novel 7-alkyl-3-(2-aminobutyl)indole free bases can be prepared by the process disclosed by Heinzelman et al., J. Org. Chem. 25, 1948, 1960. A 7-alkylindole-3-carboxaldehyde is reacted with 1-nitropropane to produce a 2-(7-alkylindoleninidenium)ethyl nitronate and the nitronate is reduced with lithium aluminum hydride. The starting 7-alkylindole-3-carboxaldehydes, e.g., 7-methylindole-3-carboxaldehyde, can be prepared by processes such as those disclosed by Boyd et al., Biochem. J. 29, 555, 1935; Smith, J. Chem. Soc. 1954, 3842; and Sumpter and Miller, "Heterocyclic Compounds with Indole and Carbazole Systems," Interscience Publishers, 1954, pp. 4 to 42.

The 7-alkyl-3-unsubstituted-indoles utilized in the preparation of the 7-alkylgramines and 7-alkylindole-3-carboxaldehydes can be prepared by the well-known Fischer synthesis, involving the cyclization of alkylphenylhydrazones of aldehydes and ketones under acidic conditions. Alternatively, the starting indoles can be prepared by cyclizing a 2-methyl-6-alkylformanilide in the presence of sodium amide, utilizing the general procedure disclosed by Verley et al., Bull. Soc. Chim. France 37, 189, 1925. Still another process for the preparation of the starting indoles is disclosed in British Patent 744,765, wherein a properly substitute benzaldehyde is condensed with 1-nitropropane to produce a benzyl alcohol, dehydrating the alcohol, and reductively cyclizing the resulting product.

7-alkyl-3-(2-aminobutyl)indole acid addition salts of the present invention can be readily prepared by mixing a free base of the invention and an organic or inorganic acid in an aqueous or non-aqueous medium. Examples of acids are hydrochloric, hydrobromic, sulfuric, phosphoric, pyruvic, acetic, tartaric, citric, benzoic and pamoic acids, and the like.

The following examples are illustrative of the products of the present invention but are not to be construed as limiting.

*Example 1.—7-methyl-3-(2-aminobutyl)indole free base and hydrochloride thereof*

A. *7-methylgramine.*—A cooled solution of 67.3 ml. of glacial acetic acid and 92.75 ml. (0.514 mole) of 25% aqueous dimethylamine was mixed with 33.9 ml. (0.418 mole) of 37% aqueous formaldehyde at such a rate that the temperature of the mixture did not rise above 5° C. The stirred solution was warmed to 25° C. and 50.0 g. (0.381 mole) of 7-methylindole was added gradually. This mixture was cooled in an ice bath to keep the temperature at about 25° C. After 2 hours, the homogeneous solution was poured into water, and the resulting mixture was decolorized with activated charcoal, and filtered. The filtrate was diluted to about 1 liter with water, cooled in an ice bath, and made basic with concentrated aqueous sodium hydroxide solution. The resulting white crystalline precipitate was collected by filtration, washed with water, and dried under reduced pressure over solid potassium hydroxide to yield 75.4 g. of 7-methylgramine which was slightly damp. An analytical sample prepared by recrystallization from methanol-water melted between 119–122° C.

*Analysis.*—Calcd. for $C_{12}H_{16}N_2$: C, 76.55; H, 8.57; N, 14.88. Found: C, 76.58; H, 8.33; N, 14.55.

B. *7-methyl-3-(2-nitrobutyl)indole.*—A solution of 65.4 g. of the damp 7-methylgramine (Part A) in 400 ml. of 1-nitropropane was concentrated to about 300 ml. with azeotropic distillation of the water present in the reaction mixture. The resulting solution was cooled to 25° C. and treated with 16 g. of powdered sodium hydroxide. A stream of nitrogen was passed through this mixture while it was refluxed gently for 10 hours. The mixture was cooled, poured into water, and extracted with ether. The ether extract was washed successively with dilute acetic acid, water, dilute ammonium hydroxide, and saturated sodium chloride solution, and was then dried over anhydrous sodium sulfate and concentrated under reduced pressure. Traces of 1-nitropropane were removed by azeotropic distillation with toluene and then with benzene to obtain 7-methyl-3-(2-nitrobutyl)indole as a dark oil.

C. *7-methyl-3-(2-aminobutyl)indole free base and hydrochloride thereof.*—A solution of 7-methyl-3-(2-nitrobutyl) indole (Part B) in 600 ml. of ethanol was stirred for 1 hour at 25° C. with 6 g. of Raney nickel catalyst. The mixture was filtered and the filtrate was hydrogenated in two equal portions at 25° C. in the presence of 6 g. of Raney nickel catalyst each at an initial hydrogen pressure of 40 p.s.i. In each instance the reaction was complete after 4 hours. The reaction mixtures were combined and filtered. The filtrate was concentrated to dryness under reduced pressure. A solution of the residue in dilute acetic acid was decolorized with activated charcoal, made ammoniacal, and extracted with ether. The ether extract was washed with saturated sodium chloride solution, dried over anhydrous sodium sulfate, and concentrated to dryness under reduced pressure to obtain 7-methyl-3-(2-aminobutyl)indole free base. An ethyl acetate solution of the free base was prepared and treated with dry ethereal hydrogen chloride. The resulting crystalline precipitate was collected by filtration and recrystallized from methanol-ethyl acetate to yield 50.4 g. of 7-methyl-3-(2-aminobutyl)indole hydrochloride (63.8% yield based on 7-methylindole). On another recrystallization from methanol-ethyl acetate the 7-methyl-3-(2-aminobutyl)indole hydrochloride melted between 206.5–208° C.

*Analysis.*—Calcd. for $C_{13}H_{19}ClN_2$: C, 65.39; H, 8.02; N, 11.74; Cl, 14.85. Found: C, 65.46; H, 8.10; N, 11.40; Cl, 14.72.

*Example 2.*—*7-ethyl-3-(2-aminobutyl)indole free base and acetate thereof*

In the same manner as shown in Example 1, 7-ethyl-3-(2-aminobutyl)indole free base was prepared by substituting 7-ethylindole for 7-methylindole, and 7-ethyl-3-(2-aminobutyl)indole acetate was prepared by substituting 7-ethyl-3-(2-aminobutyl)indole free base and acetic acid for 7-methyl-3-(2-aminobutyl) indole free base and hydrogen chloride.

*Example 3.*—*7-propyl-3-(2-aminobutyl)indole free base*

In the same manner as shown in Example 1, 7-propyl-3-(2-aminobutyl)indole free base was prepared by substituting 7-propylindole for 7-methylindole.

*Example 4.*—*7-butyl-3-(2-aminobutyl)indole free base and benzoate thereof*

In the same manner as shown in Example 1, 7-butyl-3-(2-aminobutyl)indole free base was prepared by substituting 7-butylindole for 7-methylindole, and 7-butyl-3-(2-aminobutyl)indole benzoate was prepared by substituting 7-butyl-3-(2-aminobutyl)indole free base and benzoic acid for 7-methyl-3-(2-aminobutyl)indole free base and hydrogen chloride.

The compounds of the present invention are useful as stimulants in the treatment of mental depressant states in animals and mammals. The novel compounds have the ability to induce direct stimulation to counteract mental depression as well as the ability to inhibit oxidative deamination of serotonin and catechol amines by the enzyme, monoamine oxidase (hereinafter designated as MAO). Thus, in rats when administered intraperitoneally the novel compounds have the ability to inhibit the monoamine oxidase enzyme.

The role of serotonin in brain function and the destruction of serotonin in the brain by MAO are well-known phenomena (Udenfriend et al., Annals New York Academy of Sciences 66, 602, 1957). Serotonin does not cross the blood-brain barrier so that desired levels of serotonin cannot be maintained by administering serotonin to replace the amount lost through MAO activity. Serotonin is produced in the brain by decarboxylation of its amino acid precursor, 5-hydroxytryptophan, which can cross the blood-brain barrier. The decarboxylation is effected by the enzyme 5-hydroxytryptophan decarboxylase. The regulation of serotonin levels by the administration of a MAO inhibitor is thus highly desirable. The compounds of the present invention have this MAO inhibitory characteristic to a high degree. In addition thereto, the compounds of the present invention possess an additional advantage in that they do not inhibit 5-hydroxylation of tryptophan to 5-hydroxytryptophan which also occurs in the natural sequence of serotonin development in the body. Furthermore, the present compounds also possess a decided advantage over certain compounds utilized as MAO inhibitors, e.g., hydrazine compounds, in that they do not interfere with the activity of 5-hydroxytryptophan decarboxylase, which enzyme is essential for the formation of serotonin from 5-hydroxytryptophan.

In animal testing, the compounds of the present invention have demonstrated a clear superiority over α-ethyltryptamine acetate [3-(2-aminobutyl)indole acetate], a well-known anti-depressant. For example, Table I demonstrates (in vivo tests in rats) that 7-methyl-3-(2-aminobutyl)indole hydrochloride increased brain serotonin 2 to 4 times as much as α-ethyltryptamine acetate.

TABLE I

| Compound | Dose, mg./kg. I.P. | Brain Serotonin, percent increase over control (1 hr. after dosing; each value is the average of 2 rats) |
| --- | --- | --- |
| α-Ethyltryptamine acetate | 2.5 | 22, 30, 48 |
|  | 5 | 20, 18, 42 |
|  | 10 | 22, 25, 53 |
| 7-methyl-3-(2-aminobutyl)-indole hydrochloride | 1 | 30 |
|  | 2 | 60 |
|  | 4 | 70 |
|  | 6 | 90 |
|  | 10 | 90 |

The activity of the compounds of the invention as MAO inhibitors also makes them valuable as laboratory agents. Thus, the compounds of the invention can be used in the research laboratory to inhibit selectively MAO in mixed enzyme systems. They can also be used in the characterization and quantitative determination of MAO in the laboratory.

Furthermore, the 7-alkyl-3-(2-aminobutyl)indoles of the present invention can be reacted with fluosilicic acid in accordance with U.S. Patents 1,915,334 and 2,075,359 for preparing amine fluosilicate mothproofing agents and in accordance with U.S. Patents 2,425,320 and 2,606,115 in preparing amine thiocyanate-formaldehyde condensation products for use as pickling inhibitors.

As pointed out above, the 7-alkyl-3-(2-aminobutyl)-indole racemic mixtures of this invention [e.g., dl-7-methyl-3-(2-aminobutyl)indole] can be resolved into the d and l-isomers. For this purpose there can be employed optically active acids commonly used for the resolution of amines, e.g., d-10-camphor-sulfonic acid, d-tartaric acid, dibenzoyl-d-tartaric acid (the dibenzoate of d-tartaric acid), d-camphoric acid, and the like. The diastereoisomeric dd and dl salts can be separated by fractional crystallization, e.g., using ethanol. Alternatively, a mixture of the diastereoisomeric dd and dl salts in solid form can be separated mechanically, by virtue of the different crystalline form of the diastereoisomers.

The separated dd diastereoisomeric salt [e.g., d-7-methyl-3-(2-aminobutyl)indole dibenzoyl-d-tartrate] is then dissolved in water, the solution is made alkaline with ammonium hydroxide (other bases such as sodium hydroxide or potassium hydroxide can likewise be employed), and the mixture is extracted with a water-immiscible solvent such as diethyl ether. The organic phase is separated, dried, and the dried solution is concentrated to dryness to obtain the desired d-7-alkyl-3-(2-aminobutyl)indole, e.g., d-7-methyl-3-(2-aminobutyl)indole free base, as a residue. Starting with the dl salt instead of the dd salt, the corresponding l-7-alkyl-3-(2-aminobutyl)indole, e.g., l-7-methyl-3-(2-aminobutyl)indole free base, is obtained in the same manner.

The pharmaceutical forms contemplated by this invention include pharmaceutical compositions suited for oral and injection use. The oral compositions include both solid and liquid forms. Solid compositions may be in the form of tablets, coated or uncoated; capsules, hard or soft; powders; granules; pills, and the like. Suitable solid diluents or carriers for such compositions include lipids, carbohydrates, proteins and mineral solids. The liquid compositions can be in the form of emulsions, solutions, suspensions, syrups, and elixirs.

For the treatment of domestic birds and mammals by oral administration, the therapeutic ingredient is conveniently prepared in the form of a food premix. The food premix can comprise the active ingredient in admixture with an edible diluent such as starch, oatmeal, flour, calcium carbonate, talc, dried fish meal and like non-toxic, orally acceptable diluents. The prepared premix is then conveniently added to the regular feed, thereby supplying the included medication to the animal or bird in the course of feeding.

I claim:

1. A compound selected from the group consisting of (1) 7-alkyl-3-(2-aminobutyl)indole free bases having the formula:

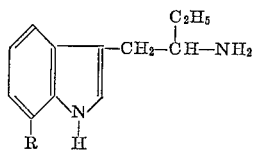

wherein R is alkyl of 1 to 4 carbon atoms, inclusive, and (2) pharmacologically acceptable acid addition salts thereof.

2. 7-methyl-3-(2-aminobutyl)indole free base.
3. 7-methyl-3-(2-aminobutyl)indole hydrochloride.
4. $d$-7-methyl-3-(2-aminobutyl)indole free base.
5. $l$-7-methyl-3-(2-aminobutyl)indole free base.

References Cited

UNITED STATES PATENTS 3,282,959  11/1966  Vane et al. _____ 260—326
3,205,236  9/1965  Allais et al. _____ 260—326

FOREIGN PATENTS 807,876  1/1959  Great Britain.

OTHER REFERENCES

Vane, Brit. J. Pharmacol. (1959) 14:87–107.
Young, J. Chem. Soc. (London) (1958) 3493–96.

NICHOLAS S. RIZZO, *Primary Examiner.*

J. A. NARCAVAGE, *Assistant Examiner.*